United States Patent [19]

Klosowski et al.

[11] Patent Number: 5,994,456
[45] Date of Patent: Nov. 30, 1999

[54] COMPOSITIONS COMPRISING MERCAPTO-FUNCTIONAL ORGANOSILICON COMPOUNDS

[75] Inventors: Jerome Melvin Klosowski, Bay City; Sarah Severson Snow, Sanford, both of Mich.

[73] Assignee: Dow Corning Corporation, Midland, Mich.

[21] Appl. No.: 09/056,968

[22] Filed: Apr. 9, 1998

[51] Int. Cl.$^6$ ........................................... C08K 3/14
[52] U.S. Cl. ................... 524/788; 524/781; 524/783; 524/780; 524/784; 524/413; 524/434; 524/858; 524/868; 524/863; 528/30; 528/17; 528/18; 528/19
[58] Field of Search ..................... 524/781, 783, 524/780, 784, 413, 434, 788, 868, 863, 858; 528/30, 17, 19, 18

[56] References Cited

U.S. PATENT DOCUMENTS

| | | |
|---|---|---|
| 3,346,405 | 10/1967 | Viventi . |
| 3,445,419 | 5/1969 | Vanderlinde . |
| 3,655,713 | 4/1972 | LeGrow . |
| 4,039,505 | 8/1977 | Homan et al. . |
| 4,082,790 | 4/1978 | Speier . |
| 4,133,939 | 1/1979 | Bokerman et al. . |
| 4,239,674 | 12/1980 | Homan et al. . |
| 4,252,932 | 2/1981 | Homan et al. . |
| 4,267,296 | 5/1981 | Homan . |
| 4,272,623 | 6/1981 | Homan et al. ............................ 528/30 |
| 4,279,792 | 7/1981 | Homan et al. . |
| 5,753,720 | 5/1998 | Nakanishi et al. ........................ 528/30 |

FOREIGN PATENT DOCUMENTS 783649  4/1968  Canada .

OTHER PUBLICATIONS

Gawrys and Post. "The Preparation of Certain Carbon–Functional Silathiols and Silathio Esters." Journal Organic Chemistry, vol. 27, p. 634ff., 1962.

*Primary Examiner*—Melvyn I. Marquis
*Attorney, Agent, or Firm*—Larry A. Milco; Sharon K. Severance

[57] ABSTRACT

A composition comprising (A) at least one mercapto-functional organosilicon compound having an average of a least two mercapto groups per molecule and (B) a cure initiator. The mercapto-functional organosilicon compound may include mercapto-functional organosilanes, mercapto-functional organosiloxanes, and mercapto-functional copolymers. The compositions of the present invention polymerize or cure to form compositions comprising reaction products of components (A) and (B). The cure initiator is a metal salt that produces a uniform cure throughout the composition, regardless of the amount of oxygen present. The cured products range in properties from soft gels to though elastomers to hard resins and are useful as molded articles, electrical encapsulants, and sealants.

16 Claims, No Drawings

COMPOSITIONS COMPRISING MERCAPTO-FUNCTIONAL ORGANOSILICON COMPOUNDS

FIELD OF THE INVENTION

The present invention relates to compositions comprising a mercapto-functional organosilicon compound and a cure initiator. This invention also relates to compositions comprising a reaction product of a mercapto-functional organosilicon compound and a cure initiator.

BACKGROUND OF THE INVENTION

Oxygen-curable compositions comprising mercapto-functional compounds are known in the art. For example, U.S. Pat. No. 4,267,296 to Homan discloses oxygen-curable compositions obtained by mixing, substantially in the absence of oxygen, at least one mercapto-functional organosilicon-organic copolymer; a mixture of at least two different types of components selected from the group consisting of at least one organosilicon-organic copolymer, at least one mercapto-functional organic compound, and at least one mercapto-functional organosilicon compound; at least one filler; a catalytic amount of an iron carbonyl catalyst; and a proton donor acid that is compatible with the mixed composition and has a dissociation constant in aqueous solution greater than $10^{-5}$.

U.S. Pat. No. 4,239,674 to Homan et al. teaches oxygen-curable mercaptoorganosiloxane compositions obtained by mixing, substantially in the absence of oxygen, at least one mercapto-functional organosiloxane having an average of at least two mercapto-functional siloxane units per molecule; optionally, a filler; and a catalytic amount of a cobaltocene.

U.S. Pat. No. 4,252,932 to Homan et al. discloses oxygen-curable mercaptoorganosiloxane compositions formed by mixing, substantially in the absence of oxygen, at least one mercapto-functional organosiloxane having an average of at least two mercapto-functional siloxane units per molecule; optionally, at least one filler; and a catalytic amount of a metal carbonyl compound.

Peroxide-curable compositions comprising mercaptoorganopolysiloxanes are also known in the art. For example, U.S. Pat. No. 4,279,792 to Homan et al. teaches compositions prepared by mixing a mercaptoorganopolysiloxane having an average of greater than two mercapto-containing siloxane units per molecule; a stannous salt of carboxylic acid having the formula $Sn(OR^1)_2$ wherein $R^1$ is a monovalent acyl radical; and optionally, an organic peroxide and/or a filler.

U.S. Pat. No. 4,039,505 to Homan et al. discloses siloxane elastomers containing sulfur prepared by mixing a polydimethylsiloxane consisting essentially of methylvinylsiloxane units; a mercaptoorganopolysiloxane having an average of at least two sulfur containing siloxane units per molecule; an organic peroxide; and, optionally a filler.

However, the prior art does not disclose compositions comprising at least one mercapto-functional organosilicon compound and a cure initiator, which cure uniformly regardless of the amount of oxygen present.

SUMMARY OF THE INVENTION

The present invention is directed to a composition comprising:

(A) 100 parts by weight of at least one mercapto-functional organosilicon compound having an average of at least two mercapto groups per molecule; and (B) 0.5 to 50 parts by weight of a cure initiator.

The present invention is also directed at a composition comprising a reaction product of (A) and (B), wherein (A) and (B) are as defined above.

The compositions of the present invention offer numerous advantages over conventional oxygen-curable and peroxide-curable organosilicon compositions. Oxygen-curable organosilicon compositions require stoichiometric amounts of oxygen to cure. Also, such compositions cure from the surface inward as a function of the ingress of oxygen. Unfortunately, oxygen transport through such compositions is retarded once a skin of cured material is formed at the surface. Consequently, these compositions are limited to a practical sample thickness of about one-quarter inch. Although, peroxide-curable compositions can be cured in the absence of oxygen at elevated temperatures, cure is typically very slow at moderate temperatures. Moreover, the rate of cure in compositions employing peroxides is often difficult to control. By contrast, the organosilicon compositions of the instant invention cure uniformly at a controllable rate throughout their entire depths regardless of the amount of oxygen initially present in the compositions or the permeability of the compositions to oxygen. Consequently, the compositions of the present invention can be used to prepare deep section samples having a thickness greater than two inches.

The cure initiators used in the compositions of the present invention provide adequate working time and a rapid deep section cure at room temperature or mildly elevated temperatures. The compositions of the present invention also exhibit a prolonged shelf life when kept cold. Unlike the trace catalysts used in conventional compositions, the cure initiators of the present invention are not easily inhibited. Moreover, the cure rate can be tailored over an extremely wide range by varying the temperature and/or the cure initiator concentration.

The compositions of this invention cure to form products ranging in properties from soft gels to tough elastomers to hard resins. These products are useful as molded articles, electrical encapsulants, and sealants.

DETAILED DESCRIPTION OF THE INVENTION

Component (A) of the present invention is at least one mercapto-functional organosilicon compound having an average of at least two mercapto groups per molecule. The term "mercapto-functional" is used herein to indicate the presence of a mercapto group, —SH, in an organosilicon compound. Preferred mercapto-functional organosilicon compounds include mercapto-functional organosilanes, mercapto-functional organosiloxanes, and mercapto-functional copolymers.

Mercapto-functional organosilanes useful in the compositions of the present invention have an average of at least two mercapto groups per molecule and are free of aliphatic unsaturation and functional groups that are reactive with mercapto groups at room temperature, such as epoxy and isocyanate. Preferably, the mercapto-functional organosilane has the general formula $$[(HS)_vZ]_wSiR_{4-w}$$

In the preceding formula for the mercapto-functional organosilane, Z is a divalent or polyvalent hydrocarbon group free of aliphatic unsaturation, the valence of Z is v+1, R is a monovalent hydrocarbon group free of aliphatic unsaturation or $OR^1$, $R^1$ is alkyl having 1 to 4 carbon atoms, subscript v has a value of at least 1, subscript w has a value of from 1 to 3, and the sum v+w has a value of at least 3.

For example, Z can be a divalent hydrocarbon group such as ethylene, propylene, 2-ethylhexylene, octadecylene, cyclohexylene, phenylene or benzylene; a trivalent hydrocarbon group such as 1,2,4-butanetriyl; or a polyvalent hydrocarbon group such as

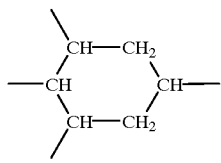

Preferably, Z is a divalent aliphatic hydrocarbon group having 2 to 4 carbon atoms. R is exemplified by, but not limited to, alkyl such as methyl, ethyl, propyl, isopropyl, butyl, isobutyl, octyl, and octadecyl; cylcoalkyl such as cyclopentyl and cyclohexyl; and aryl such as phenyl, benzyl and naphthyl. R can also be $OR^1$ where $R^1$ is alkyl having 1 to 4 carbon atoms, such as methoxy, ethoxy, propoxy, isopropoxy, butoxy, or isobutoxy. Preferably, R is alkyl having 1 to 4 carbon atoms or $OR^1$.

Mercapto-functional organosilanes useful in the compositions of the present invention include, but are not limited to, organosilanes such as $Me_2Si(CH_2CH_2CH_2SH)_2$, $Me_2Si(CH_2CHCH_3CH_2SH)_2$, $(CH_3CH_2)_2Si(C_6H_5SH)_2$, $(HSCH_2CH_2CH_2)_3SiMe$, $HSCH_2CH(SH)CH_2CH_2Si(OMe)_3$ and $(HSCH_2CH_2CH_2)_2Si(OMe)_2$ where Me is met ($CH_3$). Methods for the preparation of mercapto-functional organosilanes are well known in the art. For example, methods for the preparation of mercapto-functional organosilanes useful in the present invention are disclosed in Gawrys and Post, The Preparation of Certain Carbon-Functional Silathiols and Silathio Esters, Journal of Organic Chemistry, Vol. 27, p. 634ff. (1962) and U.S. Pat. No. 4,082,790, which are hereby incorporated by reference.

Mercapto-functional organosiloxanes useful in the compositions of the present invention have an average of at least two mercapto groups per molecule and are free of aliphatic unsaturation and functional groups that are reactive with mercapto groups at room temperature, such as epoxy and isocyanate. The mercapto-functional organosiloxanes can be disiloxanes, trisiloxanes, or polysiloxanes. The polysiloxanes generally have a number-average molecular weight of less than 500,000. The mercapto groups can be located at pendant (internal), terminal, or pendant and terminal positions in the mercapto-functional organosiloxane. Preferably, the mercapto-functional organosiloxane contains siloxane units independently selected from the group consisting of

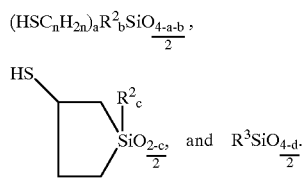

In the preceding formulae for the mercapto-functional siloxane units, $R^2$ is $R^4$ or $OR^1$, $R^4$ is alkyl having 1 to 4 carbon atoms or phenyl, R is alkyl having 1 to 4 carbon atoms, $R^3$ is $R^2$ or 3,3,3-trifluoropropyl, subscript n has a value of from 2 to 4, subscript a has a value of from 1 to 2, subscript b has a value of from 0 to 2, subscript c has a value of from 0 to 1, subscript d has a value of from 0 to 3, and the sum a+b has a value of from 1 to 3.

$R^2$ can be $R^4$, which is exemplified by methyl, ethyl, propyl, isopropyl, butyl, isobutyl, or phenyl. $R^2$ can also be $OR^1$ where $R^1$ is alkyl having 1 to 4 carbon atoms, such as methoxy, ethoxy, propoxy, isopropoxy, butoxy, or isobutoxy.

The mercapto-functional siloxane units which have the average unit formula

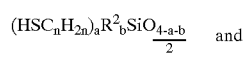

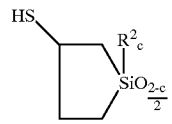

include, but are not limited to, the following:

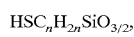

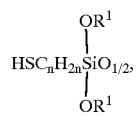

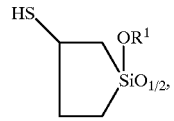

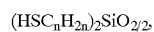

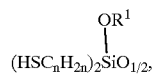

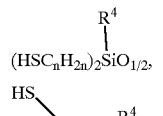

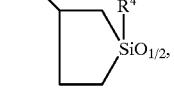

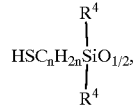

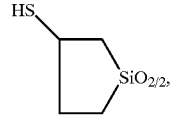

wherein $R^4$, $R^1$ and n are as defined above and n preferably has a value of 3. The mercapto-functional substituents present in the form of $HSC_nH_{2n}$ can be, for example, 2-mercaptoethyl, 3-mercaptopropyl, 3-mercaptobutyl, and 3-mercapto-2-methylpropyl. The mercapto-functional substituent can also be 2-mercapto-1,4-butane-diyl where both ends of the radical are attached to the same silicon atom.

The siloxane units which have the average formula $R^3SiO_{(4-d)/2}$ include, but are not limited to, $SiO_{04/2}$ units; monosubstituted units such as monomethylsiloxane units, monoethylsiloxane units, monopropylsiloxane units, monobutylsiloxane units, and monophenylsiloxane units; disubstituted units such as dimethylsiloxane units, diethylsiloxane units, diphenylsiloxane units, phenylmethylsiloxane units, methylbutylsiloxane units, phenylethylsiloxane units, 3,3,3-trifluoropropylmethylsiloxane units, and methylisopropylsiloxane units; and trisubstituted units such as trimethylsiloxane units, phenyldimethylsiloxane units, triethylsiloxane units, diphenylmethylsiloxane units, diphenylisopropylsiloxane units, 3,3,3-trifluoropropyldimethylsiloxane units, diphenylbutylsiloxane units and triphenylsiloxane units.

Mercapto-functional organosiloxanes useful in the compositions of the present invention include mercaptopolydiorganosiloxanes containing terminal $R_3^4SiO_{1/2}$ siloxane units and mercapto-functional siloxane units selected from the group consisting of

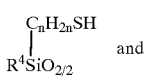
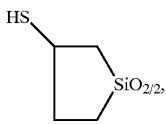

any remaining siloxane units having the formula $R_2^4SiO_{2/2}$, wherein $R^4$ and n are defined above, and the number-average molecular weight of the mercaptopolydiorganosiloxane is less than 500,000.

Preferably, $R^4$ is methyl, n is 3, and the number-average molecular weight of the mercaptopolydiorganosiloxane is less than 100,000.

Mercapto-functional organosiloxanes useful in compositions of the present invention also include mercaptopolydiorganosiloxanes having mercapto-functional siloxane units selected from the group consisting of

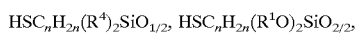
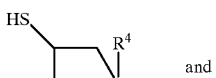
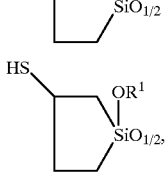

any remaining siloxane units being $R_2^4SiO_{1/2}$, wherein $R^4$, $R_1$ and n are defined above and the number-average molecular weight of the mercaptopolydiorganosiloxane is less than 500,000. Preferably, each $R^4$ is methyl, n is 3, the mercapto-functional siloxane units are selected from the group consisting of

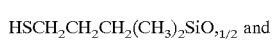

$HSCH_2CH_2CH_2(CH_3)_2SiO_{1/2}$ and

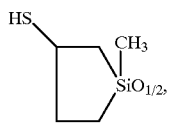

and the number average molecular weight of the mercaptopolydiorganosiloxane is less than 100,000.

Mercapto-functional organosiloxanes useful in compositions of the present invention further include mercaptopolydiorganosiloxanes having both pendant and terminal mercapto groups. Such mercaptopolydiorganosiloxanes contain two mercapto-functional siloxane units selected from the group consisting of

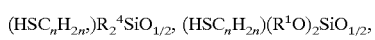
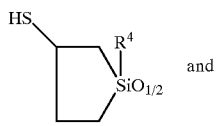
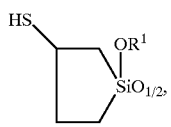

and at least one mercapto-functional siloxane unit selected from the group consisting of siloxane units of the formula

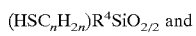
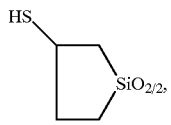

any remaining siloxane units having the formula $R_2^4SiO_{2/2}$, wherein $R^4$, $R^1$ and n are defined above and the number-average molecular weight of the mercaptopolydiorganosiloxane is less than 500,000. Preferably, each $R^4$ is methyl, n is 3, the terminal mercapto-functional siloxane units are selected from the group consisting of $HSCH_2CH_2CH_2(CH_3)_2SiO_{1/2}$ and

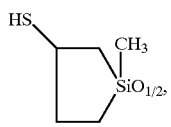

and the mercaptopolydiorganosiloxane has a number-average molecular weight of less than 100,000.

Blends comprising two or more of the preceding mercaptopolydiorganosiloxanes can also be used in the compositions of the present invention to obtain products ranging in properties from soft gels to tough elastomers to hard resins. For example, the compositions in Example 2, which contains a mercaptopolydiorganosiloxane having the formula $HSPrMe_2Si(OSiMe_2)_{1030}OSiMe_2PrSH$ and a mercaptopolydiorganosiloxane having the formula $Me_3Si(OSiMe_2)_{749}(OSiMePrSH)_6OSiMe_3$, where Pr is propyl and Me is methyl, cures to form a tough, low modulus elastomer.

The methods for preparing the above mercaptopolydiorganosiloxanes are well-known in the art. One method for making a mercaptopolydiorganosiloxane containing $HSC_nH_{2n}(R^4)SiO_{2/2}$ siloxane units and $R_3^4SiO_{1/2}$ siloxane units is taught by Viventi in U.S. Pat. No. 3,346,405. Another method is taught by Bokerman et al. in U.S. Pat. No. 4,133,939. For example, Example 1 of the Bokerman, et al, patent teaches the production of a mercaptopolydiorganosiloxane which is a trimethylsiloxy-endblocked copolymer consisting of about 94 mole percent dimethylsiloxane units and about 5 mole percent 3-mercaptopropylmethylsiloxane units. Le Grow, in U.S. Pat. No. 3,655,713 teaches methods for making mercaptopolydiorganosiloxanes having pendant mercapto groups and mercaptopolydiorganosiloxanes containing terminal mercapto groups.

Several methods for producing mercaptopolydiorganosiloxanes containing terminal $HSC_nH_{2n}R_2^4SiO_{1/2}$ siloxane units are known. One method involves the use of a disiloxane bearing a silicon-bonded mercaptoalkyl radical, such as sym-tetramethyl bis(3-mercaptopropyl)disiloxane, and a cyclic polydiorganosiloxane such as octamethylcyclotetrasiloxane. Appropriate amounts of the mercapto-functional disiloxane and cyclic polydiorganosiloxane are heated together with an acidic catalyst such as trifluoromethanesulfonic acid for 3 to 8 hours. The mixture is then neutralized and the mercapto-terminated polydiorganosiloxane is recovered.

Mercaptopolydiorganosiloxanes having both pendant and terminal mercapto groups can be prepared using the procedures outlined above for producing mercaptopolydiorganosiloxanes having terminal mercapto siloxane units by adding a cyclic mercaptopolydiorganosiloxane such as $[HSCH_2CH_2CH_2(CH_3)SiO]_4$ to the reaction mixture to introduce pendant mercapto groups into the polymer. Likewise, mercaptopolydiorganosiloxanes containing both pendant and terminal mercapto groups can be prepared using the procedures outlined above for producing mercaptopolydiorganosiloxanes having pendant mercapto groups by substituting terminal mercapto-functional siloxane units, which can be introduced in the form of a disiloxane such as sym-tetramethyl bis(3-mercaptopropyl)disiloxane, in place of non-functional endblocking units in the reaction mixture.

Cyclic mercaptopolydiorganosiloxanes can be prepared by various methods, one of which involves preparing the corresponding chloroalkylsilane, such as 3-chloropropylmethyldichlorosilane, and hydrolyzing the silanes to form a mixture of linear and cyclic polydiorganosiloxanes. If desired, the ratio of cyclic to linear polydiorganosiloxanes can be altered by heating in the presence of an acidic catalyst for a period of time, during which time a portion of the cyclic polydiorganosiloxanes formed are removed by distillation to shift the equilibrium of the reaction in the direction which favors the formation of cyclic polydiorganosiloxanes. Then, for example, Viventi teaches that the chloroalkyldiorganosiloxanes can be reacted with sodium sulfohydride to produce mercaptopolydiorganosiloxanes. Mercapto-functional silanes containing alkoxy groups such as 3-mercaptopropylmethyldimethoxysilane can also be hydrolyzed at about 40°–50° C. in the presence of an acidic catalyst and vacuum-stripped at 120° C. to remove alcohol and other undesirable volatile materials. Such mixtures can also be referred to as, for example, the 3-mercaptopropylmethyl hydrolyzate of 3-mercaptopropylmethyldimethoxysilane. Other means for preparing cyclic mercaptopolydiorganosiloxanes will be apparent to persons skilled in the art.

The production of mercapto-functional organosiloxane resins by the partial hydrolysis of mixtures of silanes such as $HSC_nH_{2n}Si(OR_1)_3$ and $R_2^4Si(OR^1)_2$ is demonstrated by the Viventi patent. Likewise, mercapto-functional organosiloxane resins result when a sufficient number of siloxane units such as $R^4SiO_{3/2}$ are present in the mercaptoorganosiloxanes taught in the Le Grow patent. The Viventi, Le Grow and Bokerman, et al, patents are hereby incorporated by reference to teach the production of mercaptoorganosiloxanes useful in compositions of the present invention.

Mercaptopolydiorganosiloxanes which contain terminal siloxane units of the formula

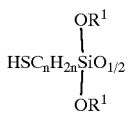

can be prepared by reacting a hydroxyl-terminated polydiorganosiloxane and a (mercaptoalkyl)trialkoxysilane of the formula

in the presence of solid potassium hydroxide or a potassium silanolate catalyst. The potassium silanolate catalyst is preferred for higher viscosity polydiorganosiloxanes. The (mercaptoalkyl)trialkoxysilane is preferably used in an excess of about 10 mole percent over stoichiometric amounts. The resulting product is essentially a polydiorganosiloxane endblocked with units of the formula

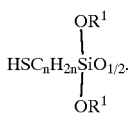

There may be some small amount of units wherein two SiOH groups have reacted with one (mercaptoalkyl)trialkoxysilane molecule, but the amount is small enough that the character of the endblocked polydiorganosiloxane is not noticeably altered.

Mercapto-functional copolymers useful in the compositions of the present invention contain both silicon-free organic segments and organosiloxane segments. The copolymers have an average of at least two mercapto groups per molecule and are free of aliphatic unsaturation and functional groups that are reactive with mercapto groups at room temperature, such as epoxy and isocyanate. For example, copolymers containing both organosilicon segments and segments such as organic polyurethane or organic polysulfide are taught in Canadian Pat. Nos. 783,649 and 911,098. In U.S. Pat. No. 3,445.419, Vanderlinde teaches the production of a mercapto-functional organosiloxane which can be classified as a graft copolymer. The three immediately preceding patents are hereby incorporated by reference to teach the production of mercapto-functional copolymers useful in the compositions of the present invention.

Component (A) of the present invention can also be a mixture comprising different mercapto-functional organosilanes, different mercapto-functional organosiloxanes, different mercapto-functional copolymers, or mixtures of the any of the above. The various combinations possible are readily apparent to one skilled in the art and include compounds in varying proportions having different molecular weights, differing mercapto groups, and varying amounts of mercapto groups. When mixtures are used, the components should be sufficiently compatible with one another to produce a composition which does not undergo appreciable separation upon storage.

Component (B) of the present invention is a cure initiator which initiates and participates in the cure reaction. The compositions of the present invention polymerize or cure to form compositions comprising a reaction product of components (A) and (B). The compositions cure predominately by the formation of disulfide (—S—S—) bonds. The cure initiator produces a uniform cure throughout the composition regardless of the amount of oxygen available. The cure initiator can be any metal salt capable of participating in an oxidation-reduction reaction substantially in the absence of oxygen with the mercapto groups in component (A) to form disulfide bonds. Cure initiators suitable for use in the present invention include salts of cooper(II), tin(IV), and mercury (I). The various salts of a given metal differ in their ability to initiate and participate in the cure reaction. However, the effectiveness of a particular metal salt in effecting cure under oxygen-free conditions can be easily determined by routine experimentation using the methods set forth in Example 5.

Preferably, the cure initiator is selected from the group consisting of copper(II) acetylacetonate, copper(II) acetate, copper(II) carbonate basic, copper(II) chloride, dibutyltin dibutoxide, dibutyltin dilaurate, and mercury(I) chloride. More preferably, the cure initiator is selected from the group consisting of copper(II) acetylacetonate, copper(II) acetate, copper(II) carbonate basic, copper(II) chloride, and dibutyltin dibutoxide. Most preferably, the cure initiator is copper (II) acetylacetonate, also represented hereinafter by the formula $Cu(acac)_2$ where acac is acetylacetonate. When $Cu(acac)_2$ is used as a cure initiator in the compositions of the present invention, acetyl acetone (2,4-pentanedione) is evolved during the cure process. The cure initiator can be a single metal salt or a mixture of two or more of the metal salts described above.

The amount of component (B) present in the compositions of the present invention is typically from 0.5 to 50 parts by weight per 100 parts by weight of the mercapto-functional organosilicon compound. Preferably, component (B) is present in an amount from 1 to 25 parts by weight, and more preferably from 1 to 10 parts by weight per 100 parts by weight of component (A). The cure rate of a composition of the present invention is dependent on the concentration of component (B). Generally, cure rate increases as the concentration of reaction initiator increases within the ranges specified above.

Fillers may be used with the compositions of this invention, but are not required. Extending fillers are typically used in an amount from 1 to 200 parts by weight per 100 parts by weight of mercapto-functional compound (A). Suitable extending fillers include titanium dioxide, calcium carbonate, talc, clay, ground or crushed quartz, diatomaceous earth, fibrous fillers such as glass or asbestos, and the like. Calcium carbonate is a preferred extending filler in the compositions of the present invention. Reinforcing fillers may also be used, such as fumed silica, surface-treated fumed silica, precipitated silica, surface-treated precipitated silica, and carbon black. Fumed silica and precipitated silica, treated or untreated, are preferred reinforcing fillers. Other additives such as coloring pigments, fire-retarding compounds and the like are also contemplated as being useful in the present invention. Because the activity of the cure initiator may be affected by water, it is preferred that any fillers or additives be substantially free of water. The effects of fillers and additives on shelf life can be determined by routine testing.

In general, the compositions of the present invention can be prepared by blending the components (A) and (B) in any order. Preferably, a one-package product is prepared by adding a dispersion of the cure initiator (B) to at least one merecapto-functional compound (A) and any filler or additives. Component (B) can be dispersed in a solvent or diluent such as toluene, mineral oil or trimethylsiloxy-terminated polydimethylsiloxane fluid. Preferably, the mercapto-functional compound and reaction initiator are combined at a temperature below about 30° C. to prevent immediate reaction of the components and thus ensure adequate working time. Low-shear mixers can be used for lower viscosity compositions while high-shear sigma blade mixers can be used for more viscous compositions such as sealant formulations containing filler.

Compositions prepared at room temperature should be used immediately after mixing. However, the shelf life of the compositions of this invention can be extended to several months by storing the mixtures at a temperature of −20° C. or below.

Alternatively, a convenient two-package product can be prepared by combining all of component (A) with part or all of any filler or additive in one package and any remaining filler or additive with all of component (B) in another package. Preferably, the components are packaged in such as manner that equal weight amounts of each package can be mixed to produce the compositions of this invention. Individual sealed packages can be stored for over 6 months at ambient conditions without any deterioration in the performance of the composition produced upon their admixture.

The compositions of the present invention polymerize or cure to form compositions comprising a reaction product of components (A) and (B). The compositions are cured at a temperature of from room temperature to 150° C., preferably from room temperature to 100° C., and more preferable from room temperature to 50° C. At temperatures substantially below room temperature, several days may be required to achieve a full cure. At temperatures above 150° C. in an enclosed environment, gas evolution is restricted and bubbles may become entrapped in the cured materials. Deep section samples measuring one inch in depth and 1.5 inches in diameter can be cured completely in about 24 hours at room temperature or in about 35 minutes at 50° C. Room temperature polymerization or cure will be satisfactory for many applications, but heating can also be used to accelerate the rate of cure.

The cured products of this invention can range in properties from soft gels to tough elastomers to hard resins. Physical properties such as durometer hardness are related to cross-link density. The crosslink density can be increased by increasing the number of mercapto groups in the mercapto-functional organosilicon compound. Generally, the higher the crosslink density, the harder the cured product will be when all other variables, such as types of substituents and structure, are kept constant.

Compositions composed of organosilicon compounds that contain an average of only two mercapto groups per molecule, especially linear compounds, are generally only capable of polymerization by chain-extension and produce tacky gums unless the mercapto-functional compounds themselves are sufficiently cross-linked or are high enough in molecular weight to result in a tack free surface after cure. Compositions containing an average of more than two mercapto groups per molecule are capable of polymerizing to from three-dimensional networks which can range from soft gels to hard resins, depending on the crosslink density.

EXAMPLES

The following examples are presented to further illustrate the compositions of this invention, but are not to be considered as limiting the invention, which is properly delineated in the appended claims. The compositions were prepared in the presence of air unless otherwise indicated. All parts and percentages reported in the examples are by weight. The following methods and materials were employed:

The mercapto (SH) content of a polymer was determined by reacting a sample with excess iodine and back titrating with sodium thiosulfate to the starch endpoint.

The hydroxyl content of a polymer was determined by Fourier transform infrared (FTIR) spectrometry using a Nicolet 605X spectrometer. The polymer samples were dissolved in carbon tetrachloride.

Number-average and weight-average molecular weights ($M_n$ and $M_w$) were determined by gel permeation chromatography (GPC) using Varian TSK 4000+2500 columns at 35° C., a chloroform mobile phase at 1 mL/min, and a refractive index detector. Polystyrene standards were used for linear regression calibrations.

Viscosity of a polymer was determined at room temperature (23°±2° C.) using a Brookfield Type B rotating disc viscometer equipped with a no. 5 spindle.

Volatile content of a polymer preparation was determined by heating a 5 gram sample of the material at 110° C. for 16 hours and determining the weight loss.

Thermal stability of a polymer was determined by thermal gravimetric analysis (TGA) using a Dupont 952 analyzer. Samples were heated from room temperature to 300° C. at 10° C./min in an air atmosphere. The resultant mass loss for each polymer was determined from the thermogram.

Tensile strength, elongation, and flexural modulus measurements were performed in accordance with ASTM D 412C using a tensiometer. Tensile strength and elongation measurements were carried out by taking the samples to ultimate failure. The modulus values refer to secant modulus at 100% elongation. Tear measurements were performed in accordance with ASTM D 624 using a tensiometer equipped with die B.

Plasticity was measured with a Scott Tester (Scott Tester Inc., Providence, R.I. using circular samples having a diameter of 14 mm and a thickness of 8 mm.

Hardness was measured with a Durometer Type 00 instrument using a sample having a thickness of 3 mm.

Skin-over time (SOT) was determined by noting the time required for the formation of a skin on the surface of a composition. Tack-free time (TFT) of a composition was determined in accordance with ASTM C-679. Tack-free time indicates when the composition is tack-free to touch with a polyethylene strip.

Finger tack is a subjective evaluation, which was determined by touching the surface of the cured composition to determine the degree of "stickyness" thereof.

The low density polyethylene SemKit® tube (Semco, Inc., Glendale, Calif.) employed in the Examples is a cylinder having the appearance of a tube commonly used for caulking compounds. The tube contains a means for introducing the components of a composition and stirring the contents. The tube can also be placed in a vacuum for removal of volatile materials from the composition therein.

Example 1

This example shows how to prepare the mercapto-functional compounds used in the compositions set forth below.

Mercaptopolydiorganosiloxane (1A)

$HSPrMe_2Si(OSiMe_2)_{1030}OSiMe_2PrSH$ was prepared by mixing 1140 g of a mixture of cyclosiloxanes having the average formula $(Me_2SiO)_4$ and 4.23 g of $(HSPrSiMe_2)_2O$ in a two liter, three-neck round bottom flask equipped with a stirrer, condenser, thermometer and nitrogen blanket. The mixture was heated to 74° C., and then 0.14 mL (0.24 g) of trifluoromethanesulfonic acid was added via syringe. The mixture was stirred for 21.5 hours and then was allowed to cool to room temperature. The cooled mixture was neutralized by adding 24.6 g $NaHCO_3$. The neutralized mixture was pressure-filtered (0.41 MPa) through a 1.2 μm acrylic copolymer membrane (Versapor® 1200 filter, Gelman Scientific), which was supported on a Whatman No. 1 paper filter. The filtrate was stripped under vacuum (<667 Pa, 160° C. ) to obtain the desired polymer. SH=0.098%; OH=70 ppm; $M_w$=95,220; $M_n$=52,400; viscosity=42.24 Pa.s; volatiles=3.32%; mass loss (TGA)=4.12%.

Mercaptopolydiorganosiloxane (1B)

$HSPrSiMe_2(OSiMe_2)_{799.6}(OSiMePrSH)_{0.3}OSiMe_2PrSH$ was prepared by mixing 994.6 g of a mixture of cyclosiloxanes having the average formula $(Me_2SiO)_4$, 0.68 g of a mixture of cyclosiloxanes having the average formula $(HSPrSiMeO)_4$, and 4.74 g of $(HSPrSiMe_2)_2O$ in a two liter, three-neck round bottom flask equipped with a stirrer, condenser, thermometer and nitrogen blanket. The mixture was heated to 65° C., and then 0.59 mL of trifluoromethanesulfonic acid was added via syringe. The mixture was stirred for 21.5 hours and then was allowed to cool to room temperature. The cooled mixture was neutralized by adding 5.9 g $NaHCO_3$. The neutralized mixture was pressure-filtered (0.41 MPa) through a 1.2 μm acrylic copolymer membrane (Versapor® 1200 filter, Gelman Scientific), which was supported on a Whatman No.1 paper filter. The filtrate was stripped under vacuum (<667 Pa, 160° C.) to obtain the desired polymer. SH=0.128%; OH=90 ppm; $M_w$=82,040; $M_n$=44,080; viscosity=29.33 Pass; volatiles=2.33%; mass loss (TGA)=1.23%.

Mercaptopolydiorganosiloxane (1C)

$Me_3Si(OSiMe_2)_{749}(OSiMePrSH)_6OSiMe_3$ was prepared by mixing 16.77 g of a mixture of cyclosiloxanes having the average formula $(HSPrMeSiO)_4$, 1176.52 g of a mixture of cyclosiloxanes having the average formula $(MeSiO)_4$, and 6.71 g $Me_3Si(OSiMe_2)_2OSiMe_3$ in a two liter, three-neck round bottom flask equipped with a stirrer, condenser, thermometer and nitrogen blanket. The mixture was heated to 65° C. and then 0.76 mL trifluoromethanesulfonic acid was added via syringe. The mixture was stirred for 5 hours and then was allowed to cool to room temperature. The cooled mixture was neutralized by adding of 25.8 g $NaHCO_3$. The neutralized mixture was pressure-filtered (0.41 MPa) through a 1.2 μm acrylic copolymer membrane (Versapor® 1200 filter, Gelman Scientific), which was supported on a Whatman No.1 paper filter. The filtrate was stripped under vacuum (<667 Pa, 160° C.) to obtain the desired polymer. SH=0.47%; OH=90 ppm; $M_4$=68,060; $M_n$=36,810; viscosity=11.52 Pa.s; volatiles=1.8%; mass loss (TGA)=2.25%.

Example 2

This example demonstrates the preparation of a composition employing copper(II) acetylacetonate as the cure initiator. A slurry of the cure initiator was prepared by mixing 10 parts of $Cu(acac)_2$ with 90 parts of toluene. A base was prepared by mixing 70 parts of polymer (1A), 30 parts of polymer (1C), and 100 parts of pre-dried (110° C., 18 hours) stearic acid-treated $CaCO_3$ (CS11®, Georgia Marble Company). A composition was prepared by mixing 10 parts of the slurry of Cu(acac)$_2$ with 200 parts of the base. The composition contained 1 part by weight of Cu(acac)$_2$ per 100 parts by weight of polymer. All mixing operations were carried out using a standard laboratory mixer.

The composition was placed in a SemKit® tube and extruded onto three polyethylene sheets. The three samples (2a, 2b, and 2c) were spread with a flat blade laboratory spatula to thicknesses of 2 mm, 1 mm, and 1.9 mm, respectively, and allowed to cure at room temperature. The compositions exhibited a skin-over time of 2–2.5 hours and a tack-free time of 3–4 hours. Table I shows the properties of the cured samples after 24 hours.

TABLE 1

| Sample | Durometer Hardness (Shore 00) | Tensile Strength (Mpa) | Elongation (%) | 100% Modulus (Mpa) |
|---|---|---|---|---|
| 2a | 70 | 0.38 | 734 | 0.24 |
| 2b | — | 0.48 | 935 | 0.14 |
| 2c | — | 0.35 | 889 | 0.12 |

Example 3

This example demonstrates the effect of temperature on the extent of cure for compositions containing copper(II) acetylacetonate. A slurry of Cu(acac)$_2$ in toluene and a base were prepared as described in Example 2. The base was immediately deoxygenated by placing a SemKit® tube containing the base in a vacuum chamber and gradually reducing the pressure to 0.10 MPa. During the gradual evacuation process, the vacuum was periodically terminated and the chamber was subsequently back filled with dry nitrogen. This gradual process eliminated spillage of the base due to excessive foaming. After 18 hours at 0.10 MPa, the chamber was back filled with dry nitrogen and the tube was sealed. A composition was prepared by injecting the slurry of Cu(acac)$_2$ into the SemKit® tube (10 parts of slurry per 200 parts base) and mixing the contents. The composition contained 1 part by weight of Cu(acac)$_2$ per 100 parts by weight of polymer. The composition was extruded into low density polyethylene (LDPE) molds having a depth of 25.4 mm and diameter of 38.1 mm. One sample (3a), designated the Control, was cured at room temperature and another sample (3b) was cured at 50° C. A third sample (3c) was cured at room temperature for 6 hours, placed in a freezer at −25° C. for 3.5 days, and then allowed to cure at room temperature. The skin-over time (SOT), tack-free time (TFT), and times required to reach Shore 00 hardness values of 30–40, 50–60, and 60–70 were determined for each sample. The results are displayed in Table II.

Example 4

This example demonstrates the effect of cure initiator concentration on the extent of cure for compositions containing copper(II) acetylacetonate. A slurry of Cu(acac)$_2$ and a base were prepared as described in Example 2. The base was immediately deoxygenated according to the method in Example 3. A composition was prepared by injecting the slurry of Cu(acac)$_2$ into the SemKit® tube (20 parts of slurry per 200 parts base) and mixing the contents. The composition contained 2 parts by weight of Cu(acac)$_2$ per 100 parts by weight of polymer. The composition was extruded into a polyethylene mold having a diameter of 38.1 mm and a depth of 25.4 mm and allowed to cure at room temperature. The skin-over time (SOT), tack-free time (TFT), and times required to reach Shore 00 hardness values of 30–40, 50–60, and 60–70 were determined for the sample. The results for this sample (4) are compared to the Control sample (3a), which contained 1 part by weight of Cu(acac)$_2$ per 100 parts by weight of polymer, in Table II.

Example 5

This example demonstrates the deep section cure and effect of atmospheric oxygen on the extent of cure for compositions containing copper(II) acetylacetonate. A composition was prepared as described in Example 2, wherein the base was not deoxygenated. The composition was placed in a SemKit® tube and extruded into a polyethylene mold having a diameter of 38.1 mm and a depth of 25.4 mm and a allowed to cure at room temperature. The skin-over time (SOT), tack-free time (TFT), and times required to reach Shore 00 hardness values of 30–40, 50–60, and 60–70 were determined for the sample. The results for this sample (5) are compared to the Control sample (3a) in Table II.

Another composition was prepared using deoxygenated base as described in Example 3, except the composition was stored at room temperature in a SemKit® tube under nitrogen. In the absence of air, the composition cured completely in 24 hours to form a tough rubber having a diameter of 38.1 mm and a thickness of 50.8 mm.

TABLE II

| Sample | Cure Temp. | Parts[1] of Cu(acac)$_2$ | Base[2] | SOT/ TFT | Extent of Cure[3] (hours to Shore 00) | | |
|---|---|---|---|---|---|---|---|
| | | | | | Initial 00 = 30–40 | Medium 00 = 50–60 | Full 00 = 60–70 |
| 3a Control | RT | 1 | D | 2–3 h/ 5–6 h | 16–20 | 22–24 | 24–30 |
| 3b | 50° C. | 1 | D | <50 min/ <50 min | <0.83 | <0.83 | <0.83 |
| 3c | RT, −25° C., RT | 1 | D | — | 14.5–18.5[4] | — | 18.5–28.5[4] |

TABLE II-continued

| Sample | Cure Temp. | Parts[1] of Cu(acac)$_2$ | Base[2] | SOT/ TFT | Extent of Cure[3] (hours to Shore 00) | | |
|---|---|---|---|---|---|---|---|
| | | | | | Initial 00 = 30–40 | Medium 00 = 50–60 | Full 00 = 60–70 |
| 4 | RT | 2 | D | 3–4 h/ 3–4 h | 5–7.5 | 7.5–11 | 12–20 |
| 5 | RT | 1 | ND | 2–3 h/ 5–6 h | 16–20 | 22–24 | 24–30 |

[1]Parts by weight per 100 parts by weight of polymer.
[2]D = Deoxygenated, ND = Not Deoxygenated.
[3]Solid, removable sample, retains shape.
[4]Extent of cure determined during final room temperature cure.

Example 6

This example further demonstrates the use of Cu(acac)$_2$ as a cure initiator in compositions containing mercaptofunctional organosiloxanes. A composition was prepared as describe in Example 2 except that polymer (1B) was substituted for polymer (1A). A sample of the composition was placed in a SemKit® tube, extruded on a polyethylene sheet, spread with a flat blade spatula to a thickness of 1.6 mm, and allowed to cure at room temperature for 18 hours. The composition exhibited a tensile strength of 0.55 Mpa, an elongation of 707%, and a modulus of 0.26 Mpa.

Another composition was prepared using a mercaptopolydiorganosiloxane having the average formula Me$_3$SiO(Me$_2$SiO)$_{43}$(HSPrMeSiO)$_5$SiMe$_3$ and a viscosity of approximately 0.10 Pa.s at 25° C. This polymer was prepared as described for polymer (1C.) in Example 1 by adjusting the monomer ratio and reaction time. Five grams of the polymer, 5 g of pre-dried (110° C., 18 hours) stearic acid-treated CaCO$_3$ (CS11®, Georgia Marble Company), and 1.13 g of Cu(acac)$_2$ powder were blended using a standard laboratory mixer. The composition contained 22.6 parts by weight of Cu(acac)$_2$ per 100 parts by weight of polymer. A sample of the composition was placed on a polyethylene sheet at room temperature and spread with a flat blade spatula to a thickness of 3 mm. The composition exhibited a skin-over time of less than 30 min and was uniformly cured in 18 hours. The sample was very brittle and dry, having a tensile strength of 0.45 Mpa and an elongation of 18%.

A second sample of the immediately preceding composition was extruded into a polyethylene mold having a diameter of 38.1 mm and a depth of 25.4 mm and cured at 50° C. The composition uniformly cured in less than 30 minutes, producing a very dry, hard, crumbly rubber which was easily removed from the mold. The material had a Shore 00 hardness value of 70–80.

Example 7

This example demonstrates the use of various metal salts as cure initiators. A slurry of each cure initiator was prepared by mixing 10 parts of the initiator with 90 parts of toluene. The base was prepared by combining 70 parts of polymer (1A), 30 parts of polymer (1C), and 100 parts of pre-dried (110° C., 18 hours) stearic acid-treated CaCO$_3$ (CS11®, Georgia Marble Company). Ten compositions were prepared by mixing 10 parts of the slurry of each cure initiator with 200 parts of the polymer base. The compositions contained 1 part by weight of cure initiator per 100 parts by weight of polymer. The compositions were placed in circular aluminum weigh pans (diameter=63 mm, height=13 mm) and allowed to cure at room temperature. The extent of cure was monitored by measuring skin-over time (SOT) and tack-free time (TFT) for each sample (7a–7j). The results are presented in Table III.

TABLE III

| Sample | Cure Initiator | SOT/TFT | Finger Tack |
|---|---|---|---|
| 7a | copper(II) acetylacetonate | ~2.5 h/ 3–4 h | dry-slightly sticky |
| 7b | Dibutyltin dibutoxide | <5 min/ <30 min | very sticky |
| 7c | Dibutyltin dilaurate | 30–50 min/ 19–33 days | very sticky |
| 7d | Mercury(I) chloride | 5–13 days/ 19–33 days | very sticky |
| 7e | Iron(III) oxide | >33 days/ >33 days | — |
| 7f | Copper(II) sulfate, anhydrous | >33 days/ >33 days | — |
| 7g | Copper(II) carbonate, basic | 1–5 days/ 1–5 days | very sticky |
| 7h | Copper(II) acetate | 1–5 days/ 5–13 days | sticky |
| 7i | Copper(II) chloride | <24 h/ 1–5 days | slightly sticky |
| 7j | Copper(II) chloride dihydrate | 13–19 days/ >33 days | — |

Example 8

This example demonstrates the effect of post cure temperature on the cured products formed in Examples 3, 4, and 5. Samples 3a, 3b, 4, and 5 were each cut into five cubes (6.4 mm). One cube of each sample was exposed to the following conditions: room temperature for 3.5 days, 110° C. for 3.5 days, 150° C. for 3.5 days, 200° C. for 3.5 days and boiling water for 1 day. The samples were allowed to cool to room temperature and the percent compression of each sample was measured using a plastometer. The results are shown in Table IV.

TABLE IV

| Post Cure Temperature | Time (days) | Plasticity (% Compression) | | | |
|---|---|---|---|---|---|
| | | Sample 3a | Sample 3b | Sample 4 | Sample 5 |
| RT | 3.5 | 76–78 | 79 | 77 | 78 |
| 110° C. | 3.5 | 74–79 | 74–79 | 74–79 | 78 |
| 150° C. | 3.5 | 78 | 79 | 73 | 76 |

TABLE IV-continued

| Post Cure Temperature | Time (days) | Plasticity (% Compression) | | | |
|---|---|---|---|---|---|
| | | Sample 3a | Sample 3b | Sample 4 | Sample 5 |
| 200° C. | 3.5 | 74 | 74 | 80 | 72 |
| Boiling water | 1 | 80–84 | 80 | 85 | 81 |

Example 9

This example demonstrates the use of reinforcing silica fillers in the compositions of the present invention. A first base was prepared by mixing 70 parts of polymer (1B) and 30 parts of polymer (1C). A second base was prepared by mixing 100 parts of the first base and 25 parts of hexamethlydisilazane-treated fumed silica (Aerosil® R812S, DeGussa). A third base was prepared by mixing 100 parts of the first base and 25 parts of hexamethlydisilazane-treated precipitated silica (Tullinox® HM100, Tulco). Each base was initially blended with a whip mixer and then further blended using a two-roll mill. Powdered $Cu(acac)_2$ (1 part by weight per 100 parts by weight of polymer) was added to each base during the final stages of mixing. A sample (100 grams) of each composition was pressed between stainless steel plates under a load of 13,600 Kg at room temperature for 2 minutes. The plates were then transferred to a hot press and maintained under a load of 13,600 Kg at 100° C. for 30 minutes. The results for each sample (9a–9c) are presented in Table V.

TABLE V

| Sample | Filler[1] (wt %) | Tensile Strength (MPA) | Elongation (%) | 100% Modulus (MPA) | Tear Strength (N/m) |
|---|---|---|---|---|---|
| 9a | no filler | 0.23 | 456 | 0.10 | 783 |
| 9b | fumed silica (20%) | 3.8 | 1287 | 0.35 | 16,310 |
| 9c | precipitated silica (20%) | 3.0 | 903 | 0.40 | 24,187 |

[1]Fillers treated with hexamethyldisilazane.

That which is claimed is:

1. A composition comprising:
   (A) 100 parts by weight of at least one mercapto-functional organosilicon compound having an average of at least two mercapto groups per molecule; and
   (B) 0.05 to 50 parts by weight of a cure initiator wherein said cure initiator is a metal salt capable of participating in an oxidation-reduction reaction substantially in the absence of oxygen with the mercapto groups in (A) to form disulfide bonds.

2. The composition according to claim 1, wherein said mercapto-functional organosilicon compound is a mercapto-functional organosilane.

3. The composition according to claim 2, wherein said mercapto-functional organosilane has the average formula $$[(HS)_vZ]_wSiR_{4-w}$$

wherein Z is a divalent or polyvalent hydrocarbon group free of aliphatic unsaturation, the valence of Z is v+1, R is a monovalent hydrocarbon group free of aliphatic unsaturation or $OR^1$, $R^1$ is alkyl having 1 to 4 carbon atoms, subscript v has a value of at least 1, subscript w has a value of from 1 to 3, and the sum v+w has a value of at least 3.

4. The composition according to claim 1, wherein said mercapto-functional organosilicon compound is a mercapto-functional organosiloxane.

5. The composition according to claim 4, wherein said mercapto-functional organosiloxane contains siloxane units independently selected from the group consisting of

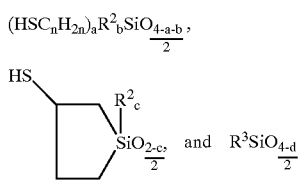

wherein $R^2$ is $R^4$ or $OR^1$, $R^4$ is alkyl having 1 to 4 carbon atoms or phenyl, $R^1$ is alkyl having 1 to 4 carbon atoms, $R^3$ is $R^2$ or 3,3,3-trifluoropropyl, subscript n has a value of from 2 to 4, subscript a has a value of from 1 to 2, subscript b has a value of from 0 to 2, subscript c has a value of from 0 to 1, subscript d has a value of from 0 to 3, and the sum a+b has a value of from 1 to 3.

6. The composition according to claim 1, wherein said mercapto-functional organosilicon compound is a mercapto-functional copolymer.

7. The composition according to claim 1, wherein said cure initiator is selected from the group consisting of copper (II) acetylacetonate, copper(II) acetate, copper(II) carbonate basic, copper(II) chloride, dibutyltin dibutoxide, dibutyltin dilaurate, and mercury(I) chloride.

8. The composition according to claim 7, wherein said cure initiator is copper(II) acetylacetonate.

9. The composition according to claim 1, further comprising a filler.

10. The composition according to claim 9, wherein said filler is selected from the group consisting of calcium carbonate, fumed silica, and precipitated silica.

11. A composition comprising a reaction product of (A) and (B), wherein (A) and (B) are defined in claim 1.

12. A composition comprising a reaction product of (A) and (B), wherein (A) and (B) are defined in claim 2.

13. A composition comprising a reaction product of (A) and (B), wherein (A) and (B) are defined in claim 3.

14. A composition comprising a reaction product of (A) and (B), wherein (A) and (B) are defined in claim 4.

15. A composition comprising a reaction product of (A) and (B), wherein (A) and (B) are defined in claim 5.

16. A composition comprising a reaction product of (A) and (B), wherein (A) and (B) are defined in claim 6.

* * * * *